United States Patent
Xia

(10) Patent No.: US 7,574,075 B2
(45) Date of Patent: Aug. 11, 2009

(54) FIBER BRAGG GRATING AND FABRICATION METHOD

(75) Inventor: Hua Xia, Altamont, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/395,788

(22) Filed: Mar. 2, 2009

(65) Prior Publication Data
US 2009/0169150 A1 Jul. 2, 2009

Related U.S. Application Data

(63) Continuation-in-part of application No. 11/855,457, filed on Sep. 14, 2007, now Pat. No. 7,499,605.

(51) Int. Cl.
*G02B 6/00* (2006.01)
*C03B 37/023* (2006.01)

(52) U.S. Cl. .......................... 385/12; 385/37; 385/123; 385/126; 65/385; 65/390; 438/32

(58) Field of Classification Search .................. 385/12, 385/37, 31, 123, 122, 124, 126, 127, 128, 385/141, 142, 143, 144; 438/32; 65/385, 65/390, 394; 250/227.11, 227.14, 227.18
See application file for complete search history.

(56) References Cited

U.S. PATENT DOCUMENTS

| | | | |
|---|---|---|---|
| 5,007,705 A | 4/1991 | Morey et al. ............... 385/37 X |
| 6,112,553 A | 9/2000 | Poignant et al. ................. 65/41 |
| 6,298,184 B1 * | 10/2001 | Putnam et al. ................. 385/37 |
| 6,647,160 B1 | 11/2003 | Chi et al. ....................... 385/12 |
| 7,151,872 B1 | 12/2006 | Xia et al. ....................... 385/12 |
| 7,499,605 B1 * | 3/2009 | Xia et al. ....................... 385/12 |
| 2003/0002795 A1 | 1/2003 | Fisher et al. ................... 385/37 |
| 2009/0074347 A1 * | 3/2009 | Xia et al. ....................... 385/12 |

OTHER PUBLICATIONS

Xia Zhang, Jingxi Zhao, Yongqing Huang, Xiaomin Ren; "Analysis of Shift in Bragg wavelength of Fiber Bragg Gratings with Finite Cladding Radius"; Proceedings of ICCT2003; pp. 586-589.

* cited by examiner

*Primary Examiner*—Brian M Healy
(74) *Attorney, Agent, or Firm*—Ann M. Agosti

(57) ABSTRACT

A method of fabrication of a thermally stabilized Type I fiber Bragg grating-based temperature sensing device includes doping a fiber core material with germanium or germanium oxide for enhancing photosensitivity, co-doping the fiber core material with fluorine or chorine or for increasing a mean coordination number; and ultraviolet laser inscribing a periodic or quasiperiodic modulated refractive index structure in the fiber core using a laser energy operating at less than 1000 milliJoules per square centimeter per pulse. The resulting sensor is operable for more than 1000 hours at temperatures up to at least 550 degrees Celsius.

20 Claims, 10 Drawing Sheets

| Type-I FBG Erasure Temp (°C) | Core Dopant | Core Dopant percentage | Co-Dopant | Co-Dopant percentage |
|---|---|---|---|---|
| 650 | Ge | ~7 wt % | B | ~10 wt % |
| 720 | Ge | ~7 wt % | B | ~7 wt % |
| 770 | Ge | ~10 wt % | B | ~2 wt % |
| 800 | Ge | ~10 wt % | F | ~1 wt % |
| 810 | Ge | ~8 wt % | Cl | <0.5 wt % |
| 820 | Ge | ~8 wt % | F | ~2.5 wt % |

"FIBER BRAGG GRATING AND FABRICATION METHOD"

CROSS REFERENCE

This application is a Continuation in Part of U.S. patent application Ser. No. 11/855,457, entitled "FIBER BRAGG GRATING FOR HIGH TEMPERATURE SENSING," filed 14 Sep. 2007, which is herein incorporated by reference.

BACKGROUND

The invention relates generally to fiber Bragg grating based sensing devices and, more particularly, to thermally stabilized fiber Bragg grating based sensing devices that can be operated at elevated temperatures as compared with conventional fiber Bragg grating based sensing devices.

In general, there are several techniques used for measurement of parameters such as temperatures. Some of the commonly used systems include thermocouples and pyrometry and blackbody measurement devices. A fiber Bragg grating (FBG) based fiberoptic temperature sensor includes a FBG that is a high quality reflector constructed in an optical fiber that reflects particular wavelengths of light and transmits other wavelengths. This is generally achieved by adding a periodic variation to a refractive index of the fiber. It is advantageous to use FBG sensors for power generation industrial process monitoring because of the sensors' low mass, high sensitivity, and electromagnetic interference immunity, for example.

However, conventional ultraviolet (UV) light induced FBG sensors exhibit undesirable thermal instability at elevated temperatures. UV inscribed FBGs may be of various types with several including Type I, Type IIA, and Type II. The type typically refers to the method by which gratings are produced in the fiber. The different methods of forming the gratings effect physical attributes of the gratings such as ability to withstand elevated temperatures. The fibers on which Bragg gratings are formed as well as any associated claddings of such fibers may be doped or un-doped. In some embodiments, both the cladding and core are doped. When the fiber core has no dopant, the fiber cladding is typically doped for reducing the cladding index of refraction so that the cladding can confine light wave propagation inside the fiber core. Typical doping atoms include as phosphorus, boron, fluorine, erbium, yttrium, aluminum, and tin.

Type I gratings are standard gratings written in both hydrogenated and non-hydrogenated fibers and are the only types of gratings that are commercially (off-the-shelf) available. A Type I grating is a periodic refractive index modulated grating structure and starts to degrade at temperatures higher than about 300 degrees Celsius after only a few, for example 2-4, hours of operation. Thus, it is difficult to use a Type I FBG as a sensor higher elevated temperature environments.

Type IIA gratings are regenerated gratings that are written after erasure of a Type I grating. These gratings require an additional writing step and higher energy levels of the inscribing lasers. Type IIA gratings generally have higher erasure temperatures than Type I gratings but require higher laser energy and longer inscription time. A Type II grating is a damage written grating inscribed by high power pulsed lasers. Fringes take the form of physical changes in the crystal lattice. On the other hand, Type II gratings, inscribed at high power levels, have a broad reflective spectrum that is generally undesirable for high temperature sensing applications. The high power pulses required of Type IIA and Type II gratings are achievable only with expensive processing equipment.

Therefore, a need exists for a high-temperature operable Type I FBG based fiber optic sensor and fabrication method that addresses one or more of the problems set forth above.

BRIEF DESCRIPTION

In accordance with one aspect of the invention, a method of fabrication of a thermally stabilized fiber Bragg grating-based temperature sensing device comprises: doping a fiber core material with germanium or germanium oxide for enhancing photosensitivity; co-doping the fiber core material with fluorine or chorine for increasing a mean coordination number; and, with a ultraviolet laser, inscribing a periodic or quasiperiodic modulated refractive index structure in the fiber core using a laser energy operating at less than 1000 milli-Joules per square centimeter per pulse.

In accordance with another aspect of the invention, a thermally stabilized Type I fiber Bragg grating based sensor comprises a fiber core including a plurality of Bragg grating elements wherein: the grating elements comprise a periodic or a quasiperiodic modulated refractive index structure; the fiber core is doped with germanium or germanium oxide; the fiber core is co-doped with fluorine or chorine; and the sensor is operable for more than 100 hours at temperatures up to at least 550 degrees Celsius.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include a fiber Bragg grating (FBG) based sensing device and a method of fabricating the same. In one embodiments, a method of fabrication of a thermally stabilized Type I fiber Bragg grating-based temperature sensing device includes doping a fiber core material with germanium or germanium oxide for enhancing photosensitivity, co-doping the fiber core material with fluorine or chorine for increasing a mean coordination number, and, with an ultraviolet laser, inscribing a periodic or quasiperiodic modulated refractive index structure in the fiber core using a laser energy operating at less than 1000 milliJoules per square centimeter per pulse. In one aspect, the fiber sensor is operable for more than 100 hours at temperatures up to at least 550 degrees Celsius. The various embodiments and materials described herein are useful in providing a higher temperature sensor than can be obtained by use of lower power pulses than are used with conventional Type IIA and Type II gratings and thus can be obtained at less expense.

Figure 1:
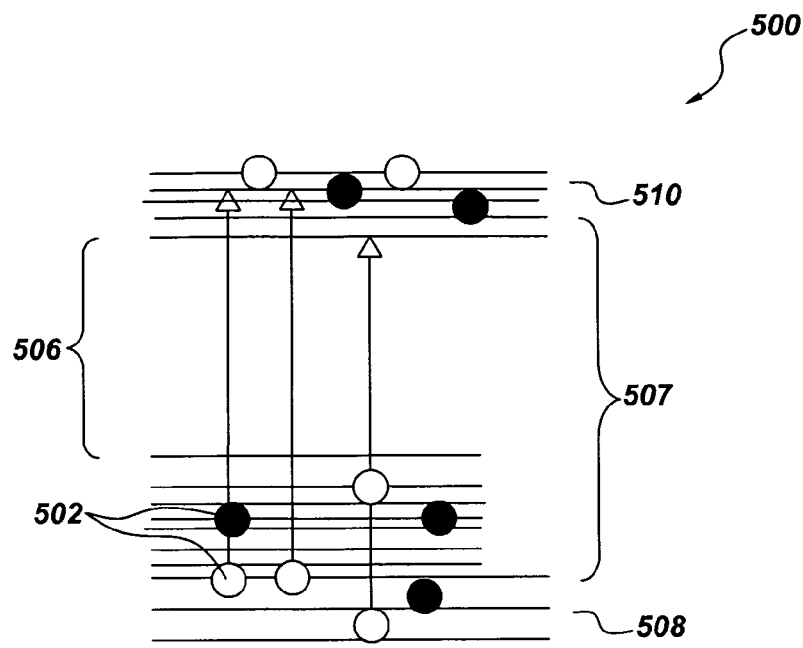
FIG. 1 is a schematic illustration of a band gap of a modified fiber material in accordance with an embodiment of the invention.

Referring to the drawings, FIG. 1 is a schematic illustration of a band gap diagram 500 of a modified fiber material with doped foreign atoms for functionalizing the fiber to have photosensitivity and also with co-doping ions to increase fiber material crosslink mean coordination number while reducing dangling bonds. The doped atoms and the co-doped ions in the fiber material form discrete energy levels in between low energy levels or covalence bands 508 and higher energy levels or conduction bands 510. Carriers 502 for example, electrons and holes, can jump from the low energy levels 508 to higher energy levels 510.

Dopant and impurities effectively reduce band gap energy of the fiber material. The loss of the band gap energy may be reduced by a thermal annealing process as described in aforementioned U.S. patent application Ser. No. 11/855,457. Such a thermal treatment process widens fiber core material bandgap from a range between about 1 eV and about 3 eV represented by reference numeral 506 to a range between about 4 eV and about 7 eV represented by reference numeral 507. Some of the impurity and dopant energy levels or carriers in deep energy levels are eliminated after the thermal annealing process, so that transfer of the carriers 502 from the low-level bands and covalence band 508 to the conduction band 510 is less likely even at elevated temperatures. A fiber material band-gap engineering method may be used to prompt nanostructure and morphology evolution from a floppy underconstrained amorphous network to a more compact tetrahedral structure with a higher coordination number for silicon or germanium atoms. The periodic or quasi-periodic modulation of the refractive index is kept during the band-gap engineering method in which the low-refractive-index area corresponds to low-density tetrahedral clusters, while high-refractive-index area corresponds to percolative tetrahedral nanophase structure. Such an alternative nanophase nanostructure effectively constructs a refractive index modulation in a fiber core.

Figure 2:
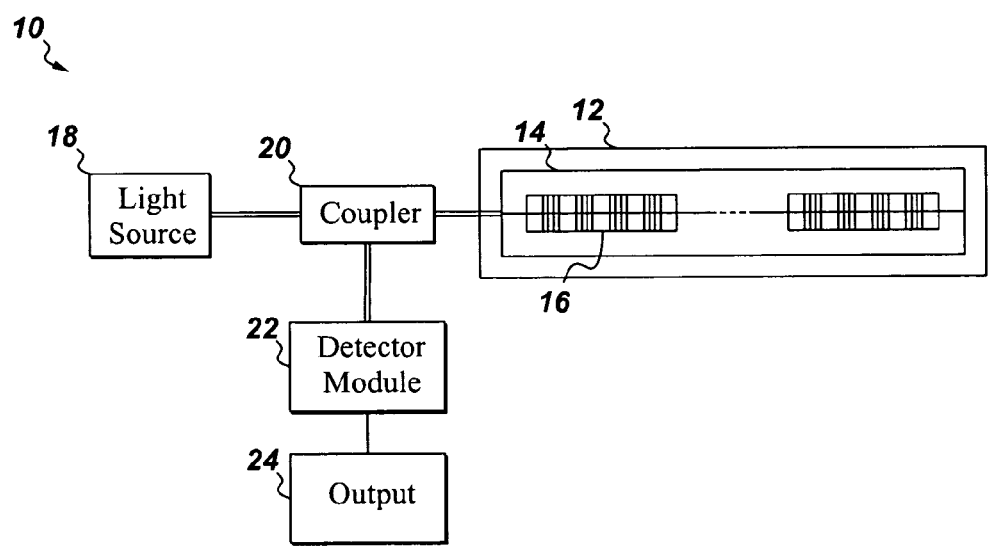
FIG. 2 illustrates an exemplary fiber optic sensing system using a fiber optic grating structure in accordance with an embodiment of the invention.

FIG. 2 illustrates an exemplary fiber optic sensing system 10 for detecting multiple parameters in a harsh environment 12. Fiber optic sensing system 10 includes one or more fiber optic sensors 14 that, in turn, include a fiber Bragg grating structure 16. As illustrated, sensors 14 are disposed in environment 12, causing changes in parameters in environment 12 to translate to fiber Bragg grating structure 16. As discussed in further detail with respect to FIG. 3, grating structure 16 includes a core that has a plurality of grating elements having a periodic or a quasiperiodic modulated Bragg grating structure.

Further, fiber optic sensing system 10 includes a light source 18 that is configured to illuminate grating structure 16. This illumination facilitates the generation of reflected signals corresponding to a grating period of grating structure 16. System 10 also includes an optical coupler 20 to manage incoming light from light source 18 as well as the reflected signals from grating structure 16. Coupler 20 directs the appropriate reflected signals to a detector module 22. In an alternative embodiment, the optical signals may be transmitted through the grating structure, and the transmitted optical signals are then sensed.

Detector module 22 receives the reflected optical signals from grating structure 16 and, in cooperation with various hardware and software components, analyzes the embedded information within the optical signals. For example, detector module 22 is configured to estimate a condition or a parameter of environment 12 based upon a reflection spectrum generated from grating structures 16 of fiber optic sensor 14. In certain embodiments, detector module 22 employs an optical coupler or an optical spectral analyzer to analyze signals from fiber optic sensor 14. Depending on a desired application, detector module 22 may be configured to measure various parameters in environment 12. Examples of such parameters include temperature, the presence of gas, strain, pressure, vibration, and radiation. The information developed by detector module 22 may be communicated to an output 24 such as, a display or a wireless communication device.

Figure 3:
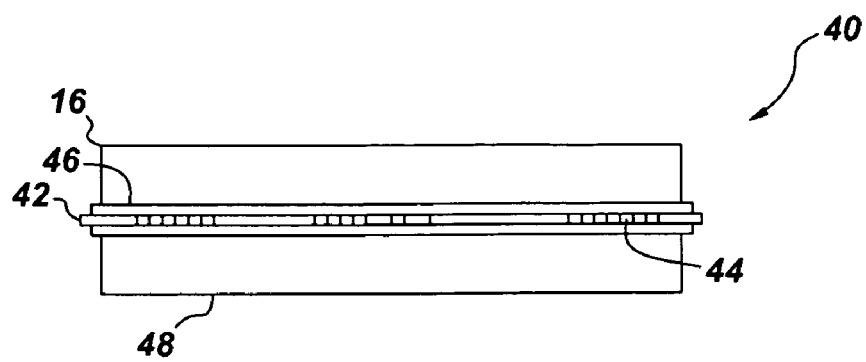
FIG. 3 is a cross-sectional view of an exemplary configuration of the fiber optic grating structure in FIG. 2.

FIG. 3 is a cross-sectional view of an exemplary configuration 40 of fiber optic grating structure 16 in FIG. 2. A thermally stabilized fiber Bragg grating based sensor comprises a fiber core 42 including a plurality of Bragg grating elements 44 that comprise a periodic or a quasiperiodic modulated refractive index structure. Fiber core 42 is doped with germanium or germanium oxide and is co-doped with fluorine or chorine, and the sensor is operable for more than 100 hours at temperatures up to at least 550 degrees Celsius. The fiber core may optionally include additional dopants to the extent such dopants do not detract from its operability requirements. As used herein, "or" is intended to be inclusive. For example, "germanium or germanium" oxide means germanium, germanium oxide, or both. As another example, "fluorine or chorine" means fluorine, chorine, or both. In a more specific embodiment, the sensor is operable for more than 100 hours at temperatures in excess of 700 degrees Celsius. In a still more specific embodiment the sensor is operable for more than 100 hours at temperatures in excess of 800 degrees Celsius.

Example fiber materials include silica, silicon dioxide, and quartz. In one embodiment, fiber core is doped with germanium in a range of 7 weight percent to 15 weight percent. Fluorine has been found to be a particularly useful co-dopant and, in one embodiment is provided in a range of 1 weight percent to 5 weight percent with a further example being at about 2.5 weight percent. Another useful co-dopant is chlorine which in one embodiment is used at a range of 0.5 weight percent to 5 weight percent. Another co-dopant which was found to work at somewhat lower temperatures and higher percentage ranges is boron in a range of 2 weight percent to 10 weight percent.

In an optional embodiment, structure 16 includes a depressed cladding 46 disposed around fiber core 42 in the region of the Bragg grating elements. As used herein, the term "depressed cladding" refers to a suppressed cladding mode wherein a fiber core-cladding interface is fabricated by lightly doping an initial cladding thickness of about 20 µm to about 40 µm with fluorine followed by heavily doping rest of the cladding so as to obtain a difference of about 0.001 in refractive index from that of the fiber core. In yet another embodiment, the depressed cladding 46 includes silicon dioxide with a fluorine ion dopant. Further, a primary cladding 48 may be disposed around the depressed cladding 46. In an example, primary cladding 48 includes silicon dioxide. The use of the depressed cladding 46 is intended to effectively confine the dopants inside fiber core 42 without diffusing into primary cladding 48 by elevated temperature. Depressed cladding 46 and primary cladding 48 have a lower index of refraction than that of fiber core 42 in order to steer light into fiber core 42. Fiber claddings may comprise silicon dioxide for example and may be doped or undoped. When doped, several example dopants include germanium, fluorine or chorine, phosphorus, and combinations thereof.

Figure 4:
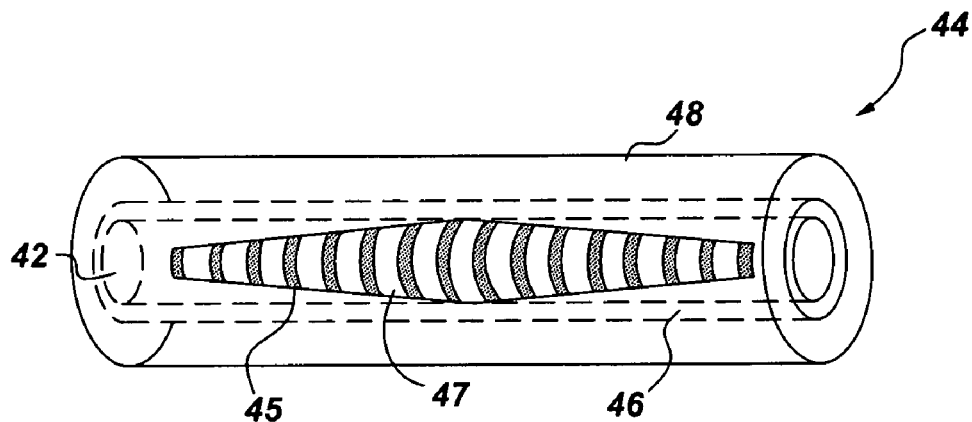
FIG. 4 is a diagrammatic illustration of exemplary grating elements of FIG. 3 including a Gaussian apodized grating profile.

FIG. 4 is a diagrammatic illustration of exemplary grating elements 44 of FIG. 3 including a Gaussian apodized grating profile. The apodized grating profile eliminates sub-coherent peaks and sharp discontinuities for signal processing and peak tracking. Advantageously, depressed cladding 46 and grating elements 44 confine a guided wave within fiber core 42 to avoid transmission loss and eliminate high-order coherent interference from adjunct grating interfaces. Further, cladding wavelength modes that reduce signal to noise ratio are suppressed. A mean coordination number, that may be floppy status or highly percolative tetrahedral clusters or in-between the floppy status and the tetrahedral cluster, inherently dominates the fiber core material nanostructure. Regions 45 and 47 correspond to mass density differences induced by both UV light illumination and thermal treatment.

Figure 5:
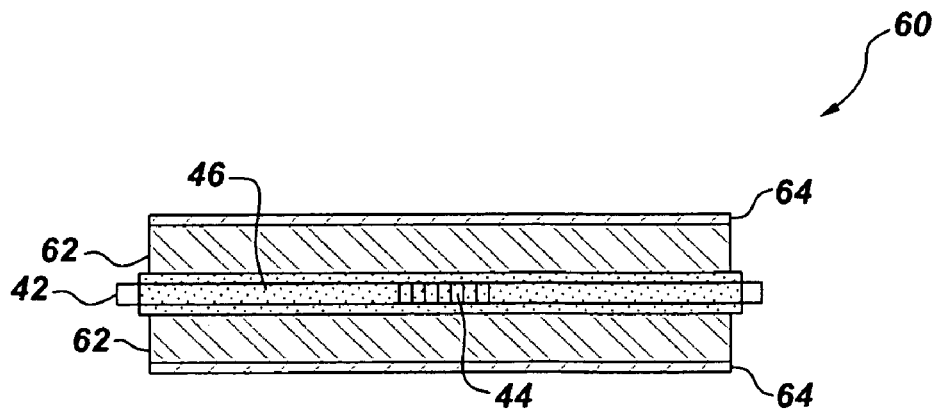
FIG. 5 is a cross-sectional view of an exemplary configuration for the single thermally stabilized high temperature fiber optic sensor 14 of FIG. 2.

FIG. 5 is a cross sectional view of an exemplary configuration 60 for the single thermally stabilized high temperature Type I fiber optic sensor of FIG. 2. The fiber optic sensor includes a fiber core 42 fiber Bragg grating structures 44, as referenced in FIG. 2. An alumina ferrule 62 may be disposed around fiber core 42 and depressed cladding 46. Alumina ferrule 62 provides mechanical strength and protection for the high temperature sensor that will be deployed in the harsh environment. Further, a high temperature alloy ferrule 64 may be disposed around the alumina ferrule to provide tolerance to high temperatures. Non-limiting examples of a high temperature alloys include stainless steel, Inconnel™ austenitic nickel-chromium based superalloys, Invar™ nickel steel alloys, Kovar™ nickel-cobalt ferrous alloys, titanium, and nickel-titanium.

Figures 6, 7:
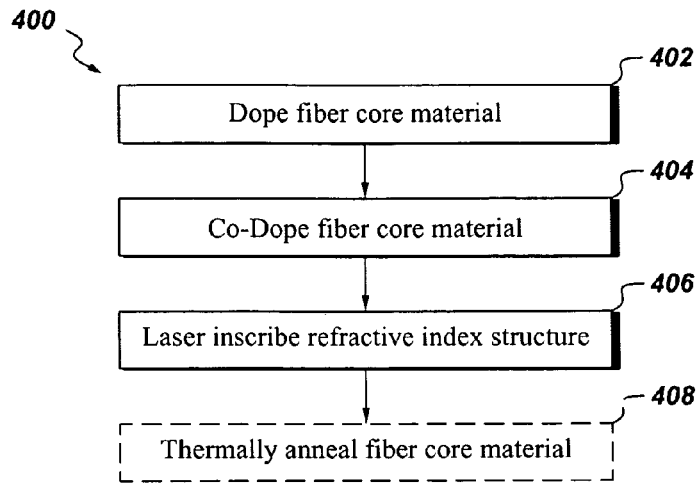
FIG. 6 is a flow chart representing steps in an exemplary fabrication method.
FIG. 7 is a table of various dopant and co-dopant percentages and the resulting erasure temperatures for a silica fiber based FBG sensor.

FIG. 6 is a flow chart representing steps in an exemplary method 400 of fiber core material band gap engineering for modifying fiber material properties. The method 400 includes doping the fiber core material with one or more atoms for enhancing photosensitivity to the fiber material in step 402. In a particular embodiment, the one or more atoms include germanium or germanium oxide. The fiber core material is also co-doped with one or more ions for enhancing an amorphous network crosslink of the resulting silicon dioxide and its bonding mean coordination number in step 404. As used herein, the term "network crosslink mean coordination number:" refers to mean silicon atom bonding number or mean coordination number in the fiber material. In an exemplary embodiment, the one or more ions include chlorine or fluorine. In another embodiment, the mean coordination number is enhanced to a range between about 2 to about 2.4. In yet another embodiment, the co-doping of the ions reduces the dangling bond density.

The method 400 further includes a step 406 of laser inscribing a periodic or quasiperiodic modulated refractive index structure in the fiber core using a laser operating at less than 1000 milliJoules per square centimeter per pulse. In a further aspect the laser inscribing comprises using a laser operating at less than 500 milliJoules per square centimeter per pulse. In still another embodiment, the laser inscribing comprises using a laser operating at less than 300 milliJoules per square centimeter per pulse.

Method 400 may optionally further comprise a step 408 of thermally annealing the fiber core material for widening the band gap of the fiber core material. In a more specific embodiment, the annealing occurs at a temperature from 300 degrees Celsius to 570 degrees Celsius for a period of time from 1 hour to 100 hours.

In one embodiment, the Fiber Bragg grating is hydrogen loaded prior to inscribing using ultraviolet laser light and phase mask technology. In another embodiment, the fiber Bragg grating is not hydrogen loaded prior to inscribing. In yet another embodiment, the grating is inscribed using pulsed ultraviolet light or near infrared femtosecond laser to enable a photon-condensation process.

EXAMPLES

The examples that follow are merely illustrative and should not be construed to be any sort of limitation on the scope of the claimed invention.

FIG. 7 is a table of various dopant and co-dopant percentages and the resulting erasure temperatures for a silica fiber based FBG sensor. As used herein, the term "erasure" refers to a change in refractive index of the grating. For a reliable operation in an elevated temperature environment, it is desirable that the grating erasure temperature exceed temperatures that are anticipated for the intended operation. A commercially available photosensitive fiber core, after being doped and co-doped in the manner described above with respect to FIG. 6, may be inscribed a UV laser energy of about 100 milliJoules per square centimeter, for example, to provide a Type I FBG inscription. As can be seen from the table, by adjusting the co-dopant atoms, combinations of atoms, and/or weight percent, the erasure temperature can likewise be adjusted. For example, the erasure temperature increased as the weight percent was lowered in the three boron trials, while the erasure temperature was higher for the increased weight percentage of fluorine in the two fluorine trials.

Figure 8:
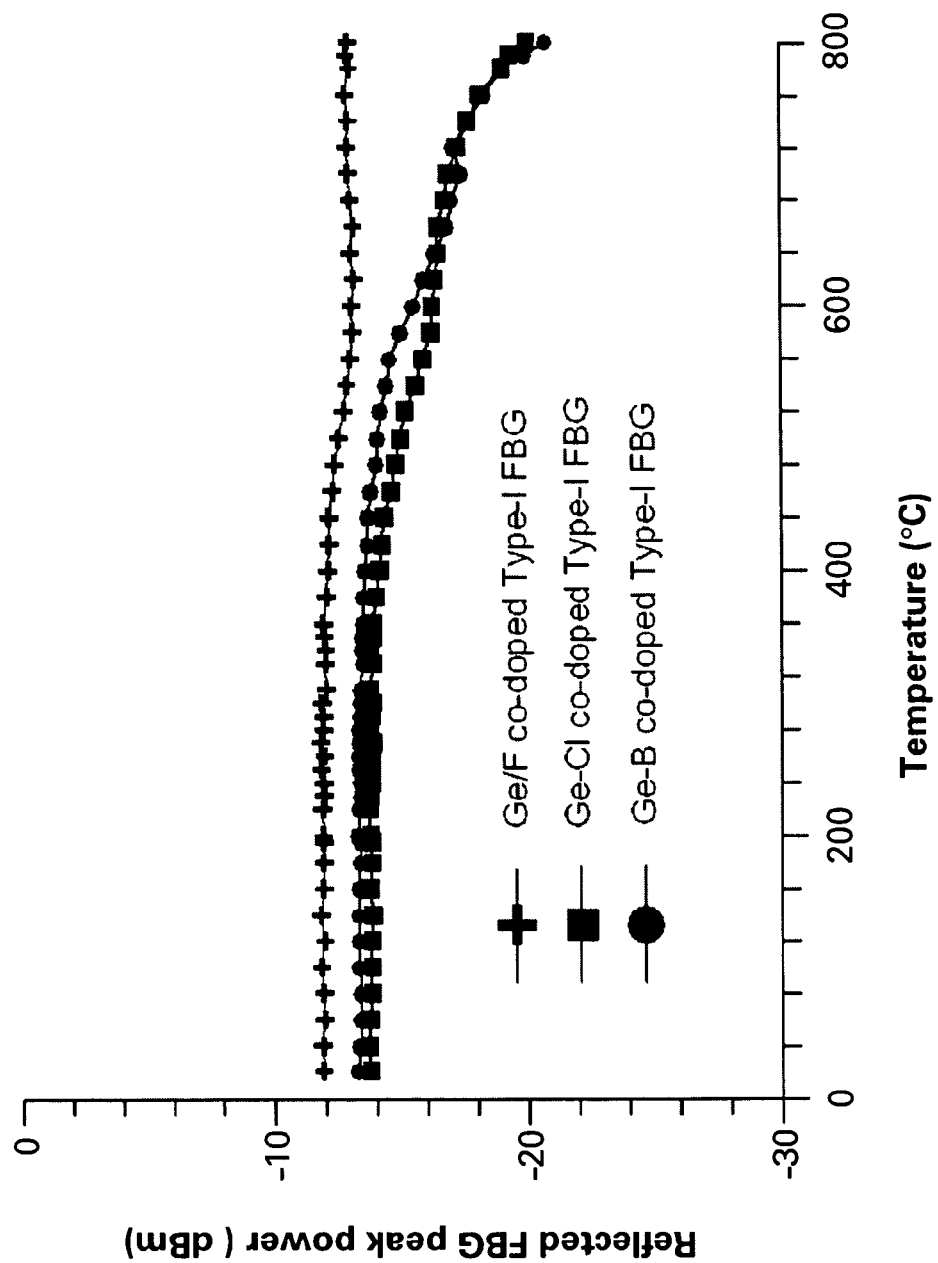
FIG. 8 is a graph illustrating reflected peak power in dBm versus temperature in degrees Celsius for three fiber material samples.

FIG. 8 is a graph illustrating reflected peak power in dBm (power ratio in decibels of the measured power reference to one milliwatt) versus temperature in degrees Celsius for three fiber material samples. In this figure the Ge/F sample was Ge 8 wt % and F 2.5 wt %, the Ge/CL sample was 8 wt % Ge and <0.5 wt % CL, and the Ge/B sample was 10 wt % Ge and 2 wt % B. Different co-dopants in the fiber core can improve peak power thermal stability for reliable operation. In this experiment, the Ge/F co-doped core had a peak power with good thermal stability in the up to at least 800 degrees Celsius.

Figure 9:
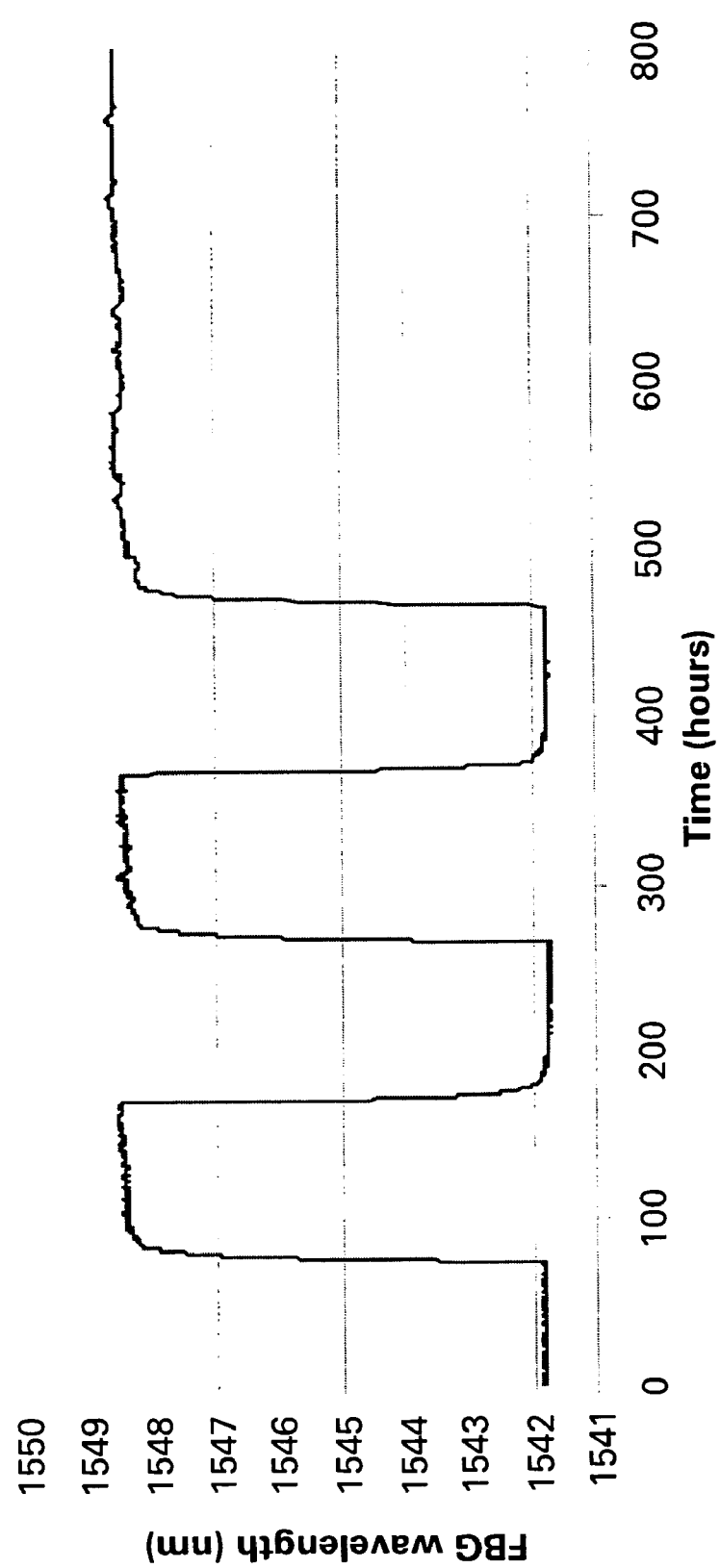
FIG. 9 is a graph illustrating FBG wavelength thermal response in nanometers versus time in hours for the Ge/F sample of FIG. 8.

FIG. 9 is a graph illustrating FBG wavelength thermal response in nanometers versus time in hours for the Ge/F sample of FIG. 8 and illustrates that the resulting sensor maintains good thermal stability over time at 550 degrees Celsius. During the experiment, two cycles were performed to cause the temperature to cycle from ambient temperature (during which time the waveform valleys occurred) to 550 degrees Celsius (during which time the waveform peaks occurred), and an isothermal test at 550 degrees Celsius was followed for the last 300 hours (during which the waveform peak was maintained). The resulting data is indicative of repeatability and survivability.

Figure 10:
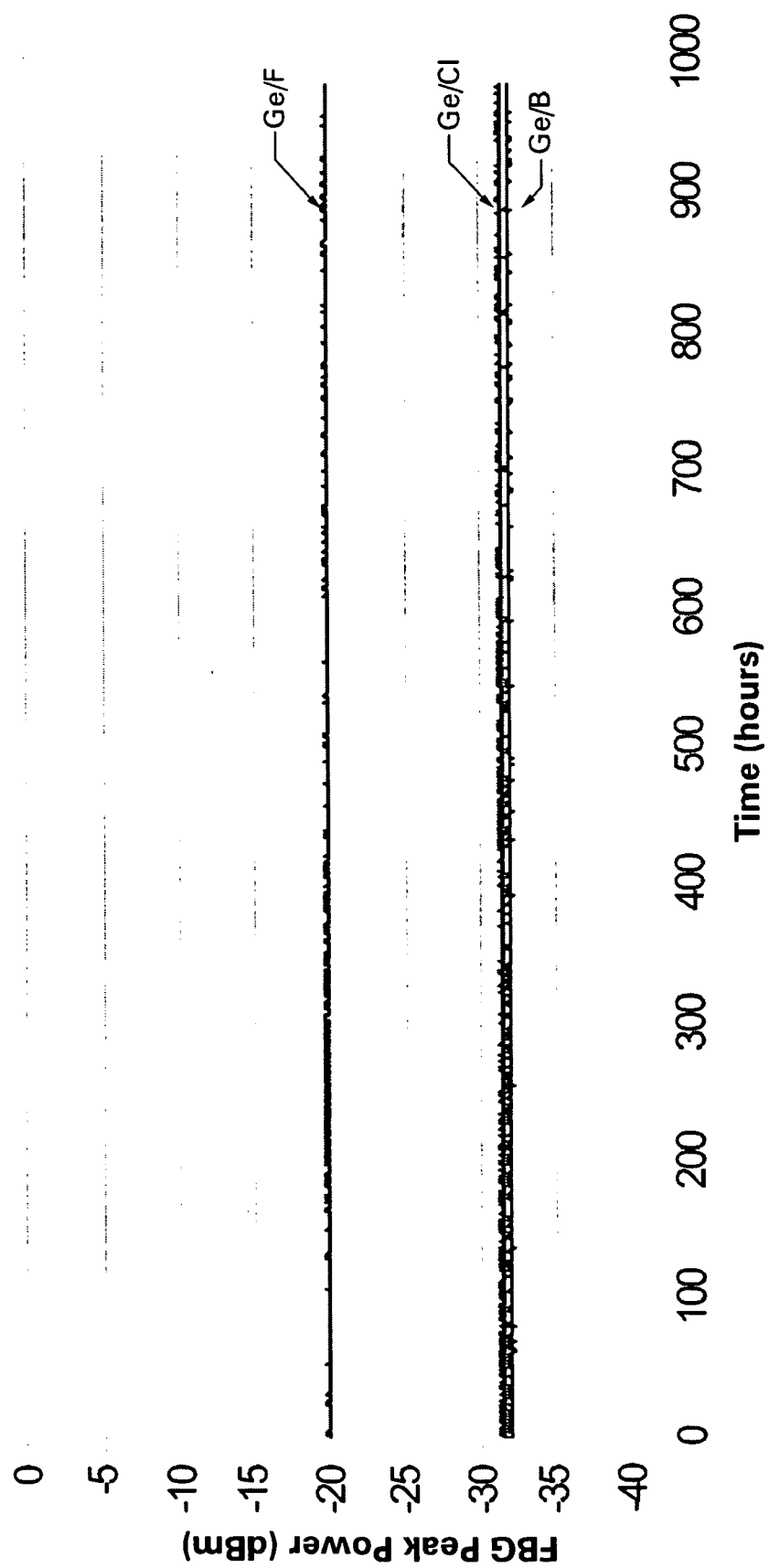
FIG. 10 is a graph of FBG peak power in dBm versus time in hours for the samples of FIG. 8.

FIG. 10 is a graph of FBG peak power in dBm versus time in hours for the three samples of FIG. 8 at 550 degrees Celsius. Once again this isothermal test indicates that the sensors can be operated at 550 degrees Celsius with negligible reflection power variation. Thus the FBG sensors of the present disclosure appear to exhibit thermally stabilized refractive index modulation and thus high thermal stability.

Figure 11:
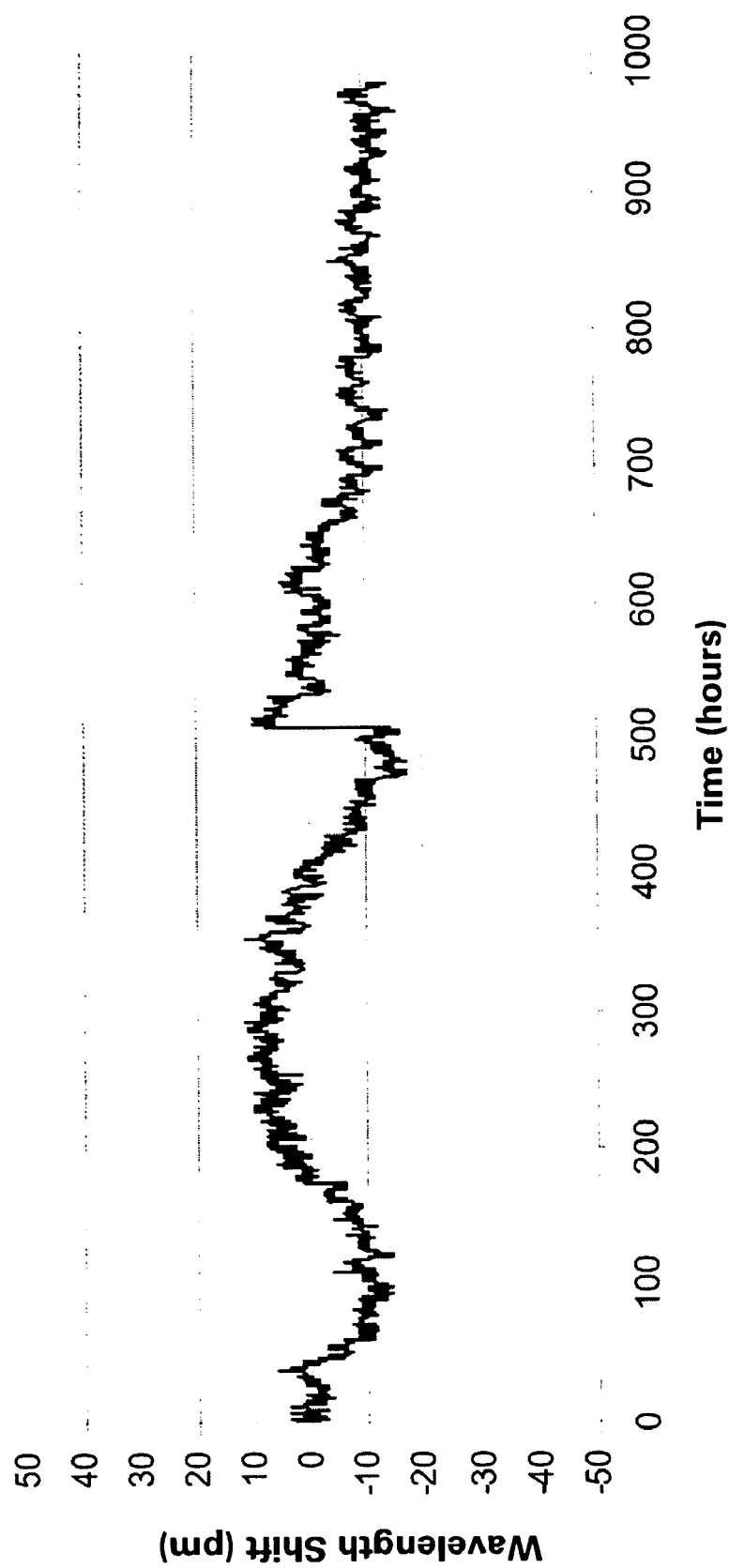
FIG. 11 is a graph illustrating wavelength shifts in picometer versus time in hours for the GE/Cl sample of FIG. 8.

FIG. 11 is a graph illustrating wavelength shifts in picometer versus time in hours for the Ge/Cl sample of FIG. 8 and illustrates that the wavelength shift fluctuation is around +/−15 pm, corresponding to +/−1.2 degrees Celsius. The small wavelength shift is mainly dominated by the testing oven thermal variation (K-Type Thermocouple feedback control), and there is no obvious thermal decay or drifting indicative of FBG sensor reliability issues. The nearly drift-free FBG thermal performance indicates that the sensor is thermally stable.

Figure 12:
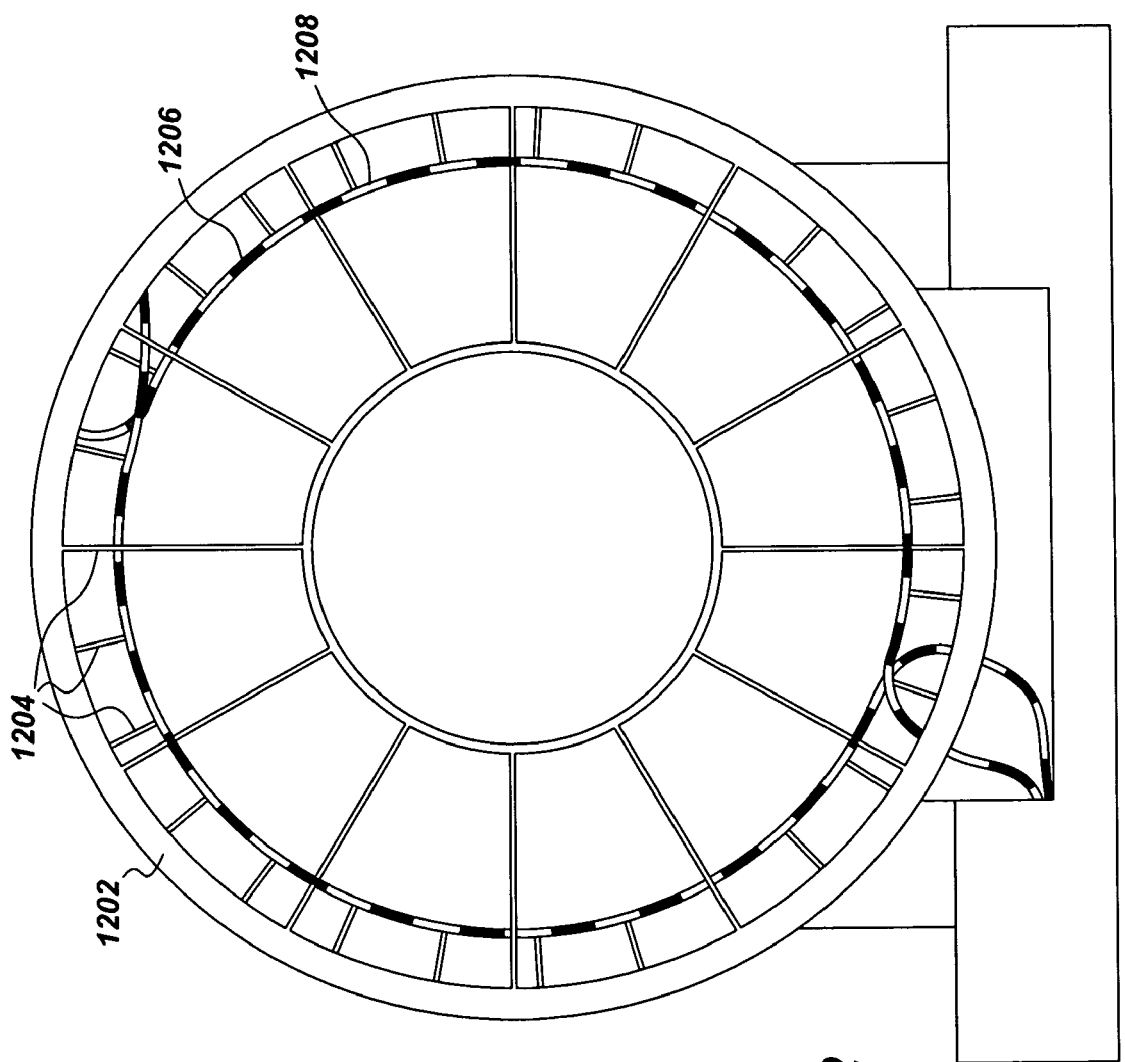
FIG. 12 is a schematic illustration of a gas turbine exhaust duct as well as FBG sensors in circumferential sensing cables.

FIG. 12 is a schematic illustration of a gas turbine exhaust 1202 showing two cables 1206 including FBG sensors 1208 supported by optional struts 1204. A similar embodiment has been in place in two gas turbines at a test facility of the assignee for the last 15 months. Fiber sensing arrays with 10 to 50 FBG sensors have been inscribed on Ge/F co-doped photosensitive fibers and packaged in stainless steel and Inconnel™ tubes to form a fiber sensing cable. Two half circumferential fiber sensing cables were installed in gas turbine exhaust ducts in the vicinity of 27 existing type K (chromel-alumel) thermocouples (not shown). Sensing instrumentation was connected with a surface cable from the two fiber sensing cables to fiber optic interrogation units (not shown).

Figure 13:
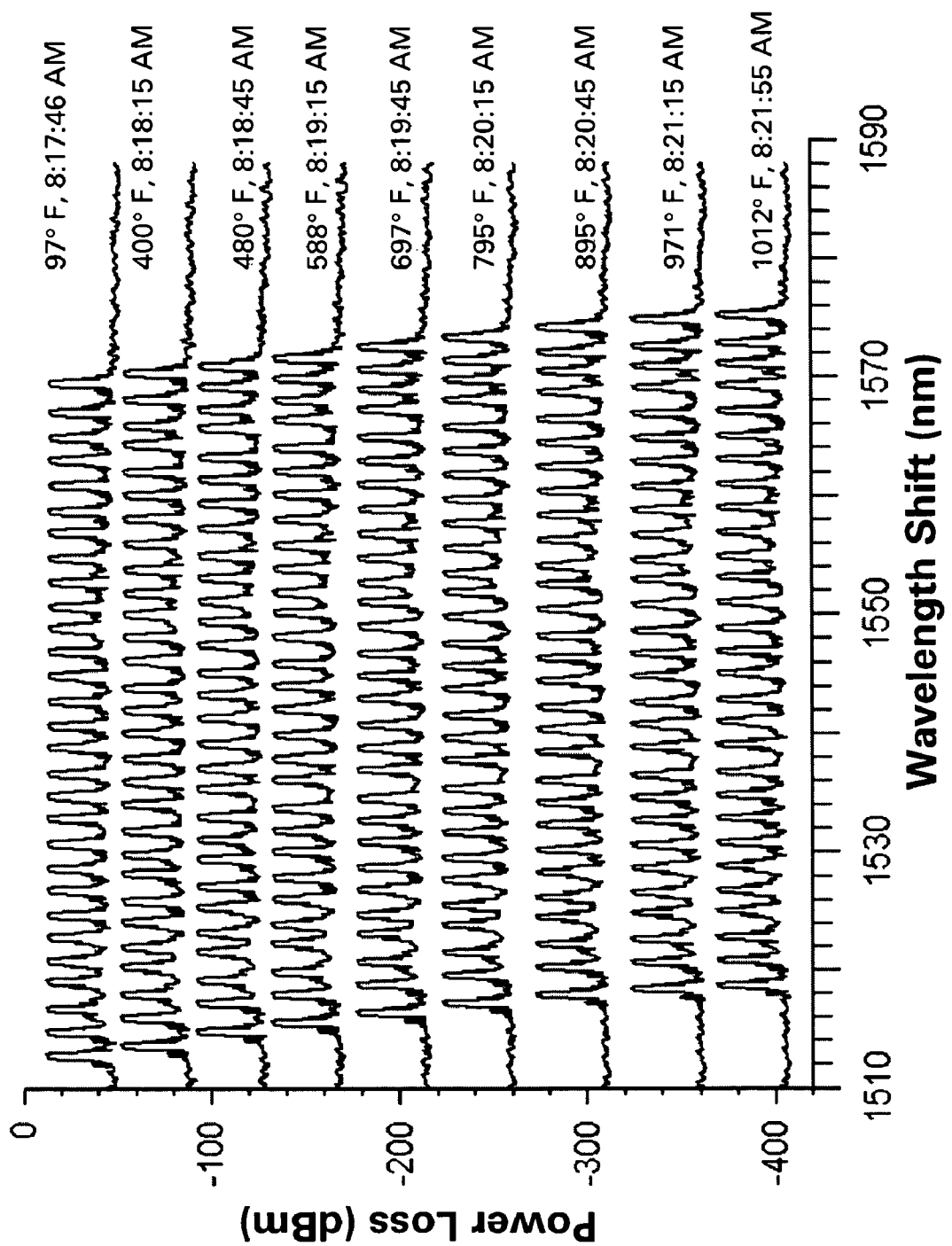
FIG. 13 is a graph illustrating power loss in dBm versus wavelength shift in nanometers for 29 Ge/F co-doped FBG sensors at different gas turbine startup temperatures.

FIG. 13 is a graph illustrating power loss in dBm versus wavelength shift in nanometers for 29 Ge/F co-doped FBG sensors at different gas turbine startup temperatures. At the initial temperature of 97 degrees Fahrenheit, 29 peaks can be identified. As the gas turbine was firing, the exhaust temperature quickly increased. At various start up temperatures all the FBG sensors or peaks were shifted to higher wavelengths. Within first 5 minutes of the transient startup process, the gas turbine exhaust temperature increased from ambient to 1020 degrees Fahrenheit then back to 660 degrees Fahrenheit as steady status operation occurred for about 3-6 hours. All the fiber sensors show transient response to gas turbine startup thermal dynamics that is similar to existing thermocouple responses.

Figure 14:
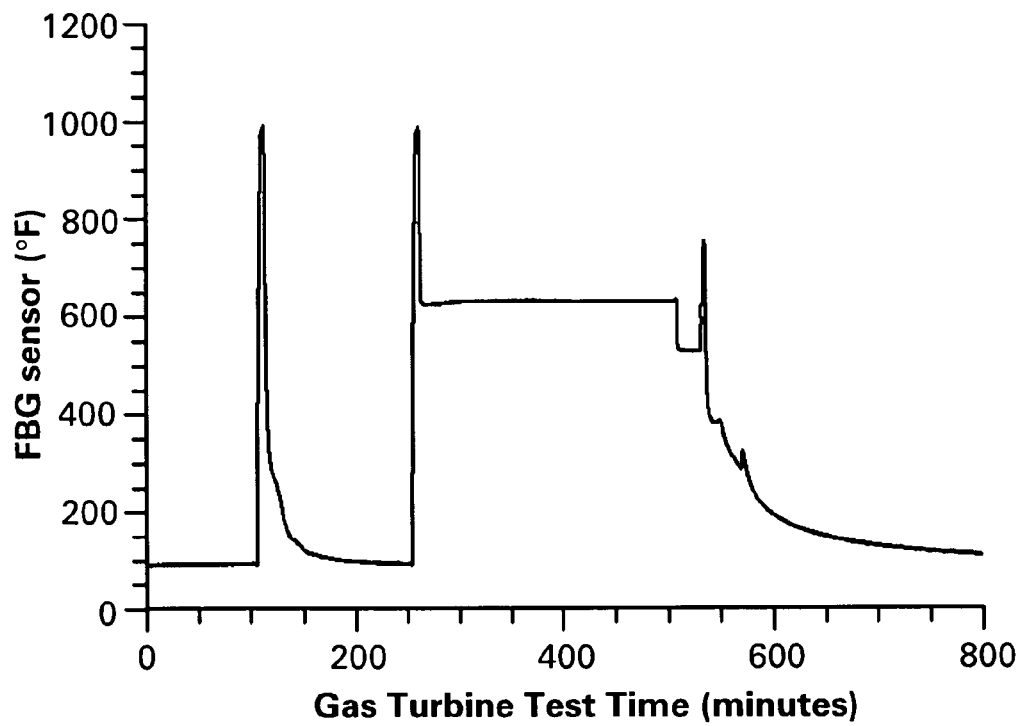
FIG. 14 is a graph showing measured averaged temperatures of the 29 GE/F co-doped FBG sensors and measured averaged temperatures of 27 inexpensive type K (chromel-alumel) thermocouples.
Figure 14:
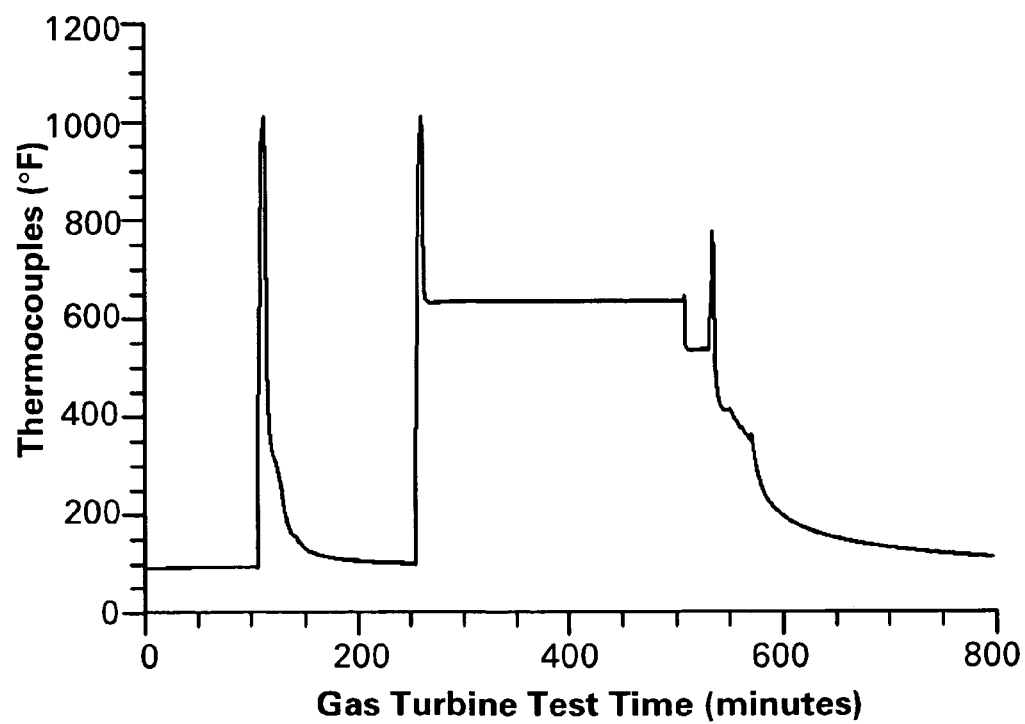

FIG. 14 is a graph showing measured averaged temperatures of the 29 GE/F co-doped FBG sensors and measured averaged temperatures of 27 inexpensive type K (chromel-alumel) thermocouples. FIG. 14 illustrates that over a temperature range of 1000 degrees Fahrenheit the measured temperatures of the GE/F sample of FIG. 8 are consistent with the measured temperatures of inexpensive type K thermocouples that were also positioned in a gas turbine of the type shown in FIG. 12. By comparing transient and steady status gas turbine operation, it is shown that both fiber sensors and thermocouples are consistent to each other in the measured exhaust temperature. When 29 FBG sensors are packaged in half circumferential sensing cables, increased spatial sensing resolution can be obtained in comparison to conventional thermocouples embodiments without requiring more penetration for installation and additional bulky electric wires and high-temperature sheath materials.

The various embodiments of a fiber optic system and fabrication method described above thus provide a way to achieve, efficient and accurate measurement of parameters in higher temperature environments than conventional Type I FBG sensors without the cost of high power laser inscribing equipment.

While only certain features of the invention have been illustrated and described herein, modifications and changes will occur to those skilled in the art. It is, therefore, to be understood that the appended claims are intended to cover all such modifications and changes as fall within the true spirit of the invention.

The invention claimed is:

1. A method of fabrication of a thermally stabilized fiber Bragg grating-based temperature sensing device comprising: doping a fiber core material with germanium or germanium dioxide for enhancing photosensitivity; co-doping the fiber core material with fluorine or chlorine for increasing a mean coordination number; and laser inscribing a periodic or quasiperiodic modulated refractive index structure in the fiber core using an ultraviolet laser with a laser energy operating at less than 1000 millijoules per square centimeter per pulse.

2. The method of claim 1 wherein laser inscribing comprises using a laser operating at less than 500 milliJoules per square centimeter per pulse.

3. The method of claim 1 wherein laser inscribing comprises using a laser operating at less than 300 milliJoules per square centimeter per pulse.

4. The method of claim 1 wherein doping comprises doping of germanium in a range of 7 weight percent to 15 weight percent.

5. The method of claim 4 wherein co-doping comprises doping of fluorine in a range of 1 weight percent to 5 weight percent.

6. The method of claim 5 wherein co-doping comprises doping of fluorine at about 2.5 weight percent.

7. The method of claim 4 wherein co-doping comprises doping of chlorine in a range of 0.5 weight percent to 5 weight percent.

8. The method of claim 1 further comprising thermally annealing the fiber core material for widening the band gap of the fiber core material.

9. The method of claim 8 wherein annealing occurs at a temperature from 300 degrees Celsius to 570 degrees Celsius for a period of time from 1 hour to 100 hours.

10. A thermally stabilized fiber Bragg grating based sensor comprising: a fiber core including a plurality of Bragg grating elements wherein the grating elements comprise a periodic or a quasiperiodic modulated refractive index structure, the fiber core is doped with germanium or germanium oxide, the fiber core is co-doped with fluorine or chorine, and the sensor is operable for more than 100 hours at temperatures up to at least 550 degrees Celsius.

11. The sensor of claim 10 further comprising a fiber cladding surrounding the fiber core in the region of the Bragg grating elements.

12. The sensor of claim 11 wherein the cladding comprises silicon dioxide.

13. The sensor of claim 12 wherein the cladding is doped with germanium, fluorine or chorine, phosphorus, or combinations thereof.

14. The sensor of claim 10 comprising germanium in a range of 7 weight percent to 15 weight percent.

15. The sensor of claim 10 comprising fluorine in a range of 1 weight percent to 5 weight percent.

16. The sensor of claim 10 comprising fluorine at about 2.5 weight percent.

17. The sensor of claim 10 comprising chlorine in a range of 0.5 weight percent to 5 weight percent.

18. The sensor of claim 10 wherein the sensor is operable for more than 100 hours at temperatures in excess of 800 degrees Celsius.

19. The sensor of claim 10 wherein the fiber core comprises silicon dioxide.

20. The sensor of claim 10 wherein the sensor comprises a Type I fiber Bragg grating based sensor.

* * * * *

UNITED STATES PATENT AND TRADEMARK OFFICE
CERTIFICATE OF CORRECTION

| | | |
|---|---|---|
| PATENT NO. | : 7,574,075 B2 | Page 1 of 1 |
| APPLICATION NO. | : 12/395788 | |
| DATED | : August 11, 2009 | |
| INVENTOR(S) | : Xia | |

It is certified that error appears in the above-identified patent and that said Letters Patent is hereby corrected as shown below:

On the Title Page, Item (57), under "ABSTRACT", in Column 2, Line 5, delete "chorine or" and insert -- chlorine --, therefor.

In Column 2, Line 15, delete "chorine" and insert -- chlorine --, therefor.

In Column 2, Line 26, delete "chorine;" and insert -- chlorine; --, therefor.

In Column 3, Line 18, delete "chorine" and insert -- chlorine --, therefor.

In Column 4, Line 46, delete "chorine," and insert -- chlorine, --, therefor.

In Column 4, Line 53, delete "chorine"" and insert -- chlorine" --, therefor.

In Column 4, Line 53, delete "chorine," and insert -- chlorine, --, therefor.

In Column 5, Line 24, delete "chorine," and insert -- chlorine, --, therefor.

In Column 8, Line 53, in Claim 10, delete "chorine," and insert -- chlorine, --, therefor.

In Column 8, Line 62, in Claim 13, delete "chorine," and insert -- chlorine, --, therefor.

Signed and Sealed this

Seventeenth Day of November, 2009

David J. Kappos
*Director of the United States Patent and Trademark Office*